United States Patent
Fransen et al.

(10) Patent No.: US 12,285,932 B2
(45) Date of Patent: Apr. 29, 2025

(54) METHOD OF PRODUCING A CELLULOSE-BASED PRODUCT

(71) Applicant: Gate Gourmet Switzerland GmbH, Glattbrugg (CH)

(72) Inventors: Ludovicus Adriaan Maria Fransen, Rijkevorsel (BE); Gert William Raf Willems, Antwerp (BE)

(73) Assignee: Gate Gourmet Switzerland GmbH, Glattbrugg (CH)

( * ) Notice: Subject to any disclaimer, the term of this patent is extended or adjusted under 35 U.S.C. 154(b) by 0 days.

(21) Appl. No.: 17/758,343

(22) PCT Filed: Jan. 21, 2021

(86) PCT No.: PCT/EP2021/051295
§ 371 (c)(1),
(2) Date: Jul. 1, 2022

(87) PCT Pub. No.: WO2021/148514
PCT Pub. Date: Jul. 29, 2021

(65) Prior Publication Data
US 2023/0039678 A1    Feb. 9, 2023

(30) Foreign Application Priority Data

Jan. 23, 2020  (EP) .................................... 20153462
Jan. 27, 2020  (EP) .................................... 20153939

(51) Int. Cl.
B32B 37/10     (2006.01)
B32B 1/00      (2006.01)
(Continued)

(52) U.S. Cl.
CPC ................ *B32B 37/10* (2013.01); *B32B 1/00* (2013.01); *B32B 7/12* (2013.01); *B32B 23/04* (2013.01);
(Continued)

(58) Field of Classification Search
CPC ....... B32B 37/10; B32B 37/12; B32B 37/003; B32B 1/00; B32B 7/12; B32B 23/04;
(Continued)

(56) References Cited

U.S. PATENT DOCUMENTS

2011/0052881 A1*  3/2011  Netravali ................ C08L 89/00
                                                           428/179
2012/0292226 A1   11/2012  Hilbish
(Continued)

FOREIGN PATENT DOCUMENTS

DE    102019124699 A1   3/2021
EP        0245005 A3    5/1989
(Continued)

OTHER PUBLICATIONS

European Search Report dated Jul. 20, 2020 for EP20153462.5.
(Continued)

*Primary Examiner* — John L Goff, II
(74) *Attorney, Agent, or Firm* — Dorsey & Whitney LLP

(57) ABSTRACT

The present invention relates to a method of producing a cellulose-based product (103,700), wherein the method comprises the steps of: (i) providing at least two layers including one first (104a) and one second (104b) layer, and wherein said first (104a) and second layer (104b) each comprise cellulose fibers, and wherein at least one side of said first (104a) and/or said second (104b) layer is pre-treated with an adhesive coating, (ii) arranging said at least two layers including the one first (104a) and the one second (104b) layers in a superimposed relationship to each other in a forming mold (102) of a form press (101), thereby generating a stack (104) of said at least two layers including the one first (104a) and the one second (104b) layers, wherein said first (104a) and second (104b) layers are oriented within the stack (104) such that said at least one pre-treated side of (Continued)

Figure 1:
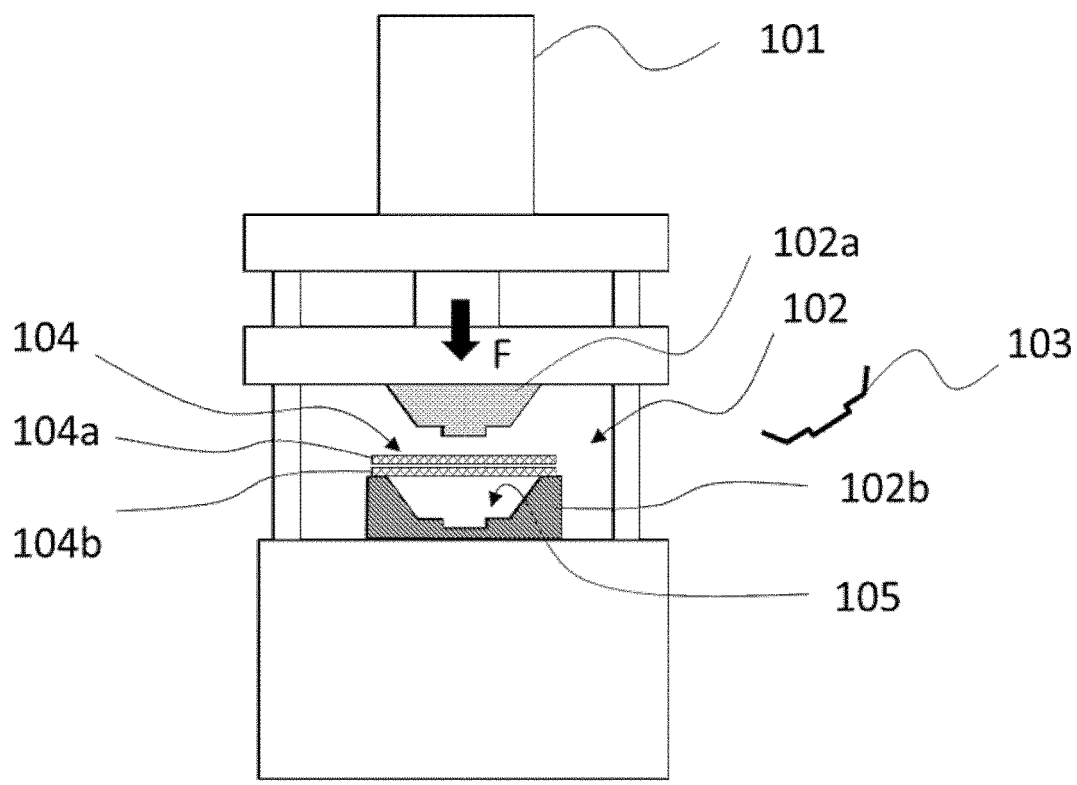

said respective first (104a) and/or second (104b) layer is facing towards the superimposed layer, (iii) form pressing said stack (104) of at least two layers including the one first (104a) and the one second (104b) layers in a forming mold (102) at a forming temperature of at least 50° C. up to a forming end-pressure of at most 1100 MPa, into a cellulose based product (103, 700) of a predetermined shape and a single layer configuration, wherein in said step (iii) said layers including said one first (104a) and said one second (104b) layers are moveable with respect to each other until said forming end-pressure is reached.

16 Claims, 7 Drawing Sheets

(51) Int. Cl.
*B32B 7/12* (2006.01)
*B32B 23/04* (2006.01)

(52) U.S. Cl.
CPC ....... *B32B 2250/02* (2013.01); *B32B 2255/02* (2013.01); *B32B 2262/062* (2013.01); *B32B 2307/7163* (2013.01); *B32B 2309/02* (2013.01); *B32B 2309/12* (2013.01)

(58) Field of Classification Search
CPC ............ B32B 2250/02; B32B 2255/02; B32B 2262/062; B32B 2307/7163; B32B 2309/02; B32B 2309/12; B32B 2037/1276; B32B 38/12; B32B 38/1866; B32B 29/005; B32B 2038/042; Y02W 90/10; B29C 65/70; B29C 66/342; B31D 5/02

USPC ........................................................ 156/245
See application file for complete search history.

(56) References Cited

U.S. PATENT DOCUMENTS

| 2016/0221742 | A1 * | 8/2016 | Edwards .............. B65D 43/162 |
| 2018/0304607 | A1 | 10/2018 | Öhman et al. |
| 2019/0202191 | A1 | 7/2019 | Toft et al. |
| 2019/0375128 | A1 | 12/2019 | Sokka |

FOREIGN PATENT DOCUMENTS

| EP | 2862710 A1 * | 4/2015 | ............... B31F 1/00 |
| FR | 02653705 | 5/1991 | |
| FR | 2653705 B1 | 1/1992 | |
| GB | 1529778 A | 10/1978 | |
| JP | A1987028363 | 2/1987 | |
| JP | 1993154034 | 6/1993 | |
| JP | A1998008394 | 1/1998 | |
| JP | 1998044228 | 2/1998 | |
| WO | 03099539 A1 | 12/2003 | |
| WO | 2010109000 A2 | 9/2010 | |
| WO | 2010109000 A3 | 11/2010 | |
| WO | 2017160217 A1 | 9/2017 | |
| WO | 2017209160 A1 | 12/2017 | |
| WO | WO-2019209160 A1 * | 10/2019 | ............. B29C 43/18 |

OTHER PUBLICATIONS

International Search Report and Written Opinion dated Apr. 9, 2021 for PCT/EP2021/051295.

First Office Action dated May 30, 2023 issued in Chinese patent application No. 202180009595.5.

* cited by examiner

METHOD OF PRODUCING A CELLULOSE-BASED PRODUCT

RELATED APPLICATIONS

This application is a National Stage Entry of International Application No. PCT/EP2021/051295, filed Jan. 21, 2021, which claims priority to European Patent Application No. 20153462.5, filed Jan. 23, 2020, and European Patent Application No. 20153939.2, filed Jan. 27, 2020, each of which is incorporated herein by reference in its entirety.

I. FIELD OF THE INVENTION

The present invention relates to a process for producing a cellulose-based product. Said product is typically a three-dimensional article, such as, but not limited to containers, cutlery and/or tableware, typically for single use.

II. BACKGROUND ART

Today the vast majority of the articles for single use are made of plastics. Plastics in general and in particular in the area of disposable articles are generating significant environmental challenged and concerns. Thus, there is an almost sky-rocketing demand for ecologically advantageous articles for single use. A low-price material having a low impact on environmental load and therefore commonly used for packaging inserts is moulded pulp. Moulded pulp is a packaging material, typically made from recycled paperboard and/or newsprint. It is used, for example for protective packaging such as inserts, beverage holders, protective buffer packaging etc. However, when in direct contact with food items, such as trays, plates bowls etc. moulded pulp is not made of recycled material, but comes from any kind of virgin fiber like wood, bamboo, bagasse or even wheat straw. The cellulose fibers of these raw materials are dispersed in water, then formed and dried. Because the drying step is a time and energy consuming process, there is a need to circumvent this process step.

The WO2017/160217A1 describes a method of manufacturing a single layered cellulose-based product by form pressing a cellulose blank containing less than 45% water in a forming mold and heating said cellulose blank to a forming temperature of 100° C. to 200° C., whereas a form pressure in the range of 1 MPa to 100 MPa is applied.

The WO2017/209160 relates to a method for producing a cellulose-based product from a multi-layer stack. According to said process a multi-stack, which was in a first step obtained by heat pressing of at least two layers made of cellulose fibers is in a second step formed into a cellulose-based product by further heat pressing with an isostatic forming pressure of at least 1 MPa, wherein the multi-layer stack is shaped into a two-dimensional or three-dimensional fiber composite structure having a single-layer configuration.

While these processes provide a satisfactory product, they still require a lot of energy and a complex series of production steps.

There is thus a need for improved processes for producing environmentally advantageous cellulose-based products, wherein said products have satisfactory mechanical and chemical properties, can be manufactured with high precision as well as cost- and energy-efficient. In addition, such process should allow for preparing cellulose-based products that are aesthetically attractive and exhibit a number of additional performance parameters, such as low heat or cold conductivity, compostable and or recyclable and are of attractive haptic to the customer.

III. SUMMARY OF THE INVENTION

It is therefore an object of the present patent application to provide a method for producing a cellulose-based product where one or more of the above-mentioned problems, which are inherent to the processes of the prior art are avoided or at least improved. This object is fulfilled by the process as claimed in the independent claim and the further embodiments being subject of the dependent claims.

These and other objects are solved by the method according to the present invention of producing a cellulose-based product (103,700), wherein the method comprises the steps of:

(i) providing at least two layers including one first (104a) and one second (104b) layer, and wherein said first (104a) and second layer (104b) each comprise cellulose fibers, and wherein at least one side of said first (104a) and/or said second (104b) layer is pre-treated with an adhesive coating, (ii) arranging said at least two layers including the one first (104a) and the one second (104b) layers in a superimposed relationship to each other in a forming mold (102) of a form press (101), thereby generating a stack (104) of said at least two layers including the one first (104a) and the one second (104b) layers, wherein said first (104a) and second (104b) layers are oriented within the stack (104) such that said at least one pre-treated side of said respective first (104a) and/or second (104b) layer is facing towards the superimposed layer, (iii) form pressing said stack (104) of at least two layers including the one first (104a) and the one second (104b) layers in a forming mold (102) at a forming temperature of at least 50° C. up to a forming end-pressure of at most 1100 MPa, into a cellulose based product (103, 700) of a predetermined shape and a single layer configuration, wherein in said step (iii) said layers including said one first (104a) and said one second (104b) layers are moveable with respect to each other until said forming end-pressure is reached.

In one embodiment the adhesive coating is a water-based dispersion or emulsion and is preferably biodegradable and/or recyclable. The adhesive coating may be selected from the group consisting of soy based adhesives, linseed oil based adhesives.

According to one embodiment the area weight of said coating ranges from 0.5 to 50 gsm, or from 2 to 20 gsm of the first (104a) and/or (104b) second layer. Said first (140a) and/or second (104b) layer may comprise one or more additives that are altering the mechanical, hydrophobic, oleophobic, haptic, aesthetic properties of the cellulose-based product, and wherein said first and/or second layer are constituted by 50 to 90% dry wt cellulose fibers and 10 to 50% dry wt of said one or more additive.

The one or more additives may be selected from the group consisting of starch compounds, in particular starch-based polymers, rosin compounds, polycarboxylic, in particular butanetetracarboxylic acids, gelatin compounds, alkyl ketene dimer (AKD), alkenyl succinic anhydride (ASA), wax compounds, silicon compounds, calcium compounds and fluorocarbons.

The one or more additive may be added to said first (104a) and/or second (104b) layer prior to or as part of step (i).

In one embodiment the forming mold (102) is heated to a forming temperature of from 50° C. to 200° C., or from 50° C. to 100° C.

The biodegradable coating may be applied with the same or a varying thickness to at least one side of each of the first and second layers (104a, 104b).

In one embodiment, each of said first (104a) and second (104b) coated layers has an area weight ranging from 50 to 2000 gsm, or an area weight ranging from 250 to 380 gsm.

In one embodiment said stack (104) comprises or consists of 2 to 10, or 2 to 7, or 2 to 5 first (104a) and second (104b) layers.

In one embodiment the total weight of the cellulose based coated layer is in the range of 650 to 2200 gsm, or in the range of 1000 to 1700 gsm.

In one embodiment the surface of said cellulose based product (103, 700) is dip coated or sprayed or curtain poured or brushed with a finish.

In another embodiment said stack (104) comprises one or more additional layers (304c, 404c), which comprise 2 to 5% dry wt of thermoplastic reinforcing fibers having a melting temperature below the forming temperature.

In a still further embodiment, the present invention is directed to a cellulose based cutlery and/or cellulose based tableware manufactured according to the method according to the present invention.

One particular advantage of the claimed method is to be seen in the fact that the individual layers ultimately constituting the cellulose based product stay moveable with respect to each other for a comparably longtime during formation. This allows for a relaxation of stress and strain, primarily within the material between the individual cellulose based layers, occurring during formation under pressure, which in turn reinforces the so-produced product and provides the product with a high stiffness. For example, the stiffness of the final product is between 20 and 40% higher compared to a product which was produced by pre-laminating the individual layers such that prior to form pressing the individual layers already adhere together. That is, because in the case of pre-laminating before form pressing stress and strain, which results from deformation of the adhered layers during form pressing, is not released. Therefore, the individual layers do not obtain the freedom to move, slight or shift against each other while being subject to the deformations. Stiffness is hereby defined as the measure of resistance offered by the final product to mechanical deformation, e.g. deformation due to form pressing.

Therefore, further advantageously less material is necessary for product manufacture, which lowers production cost and resource requirements.

Furthermore, the layer-structure allows for the implementation of various aesthetic and/or in-use properties within the respective layers enabling the production of tailor-made products for individual customers.

In addition, the process does not need a pre-compacting step, which is disadvantageous under energy-, cost-, complexity and machine footprint aspects of the claimed process.

IV. BRIEF DESCRIPTION OF DRAWINGS

FIG. 1 schematically shows a method for producing a cellulose based product from a stack of a first and a second layer in a form press.

Figure 2:
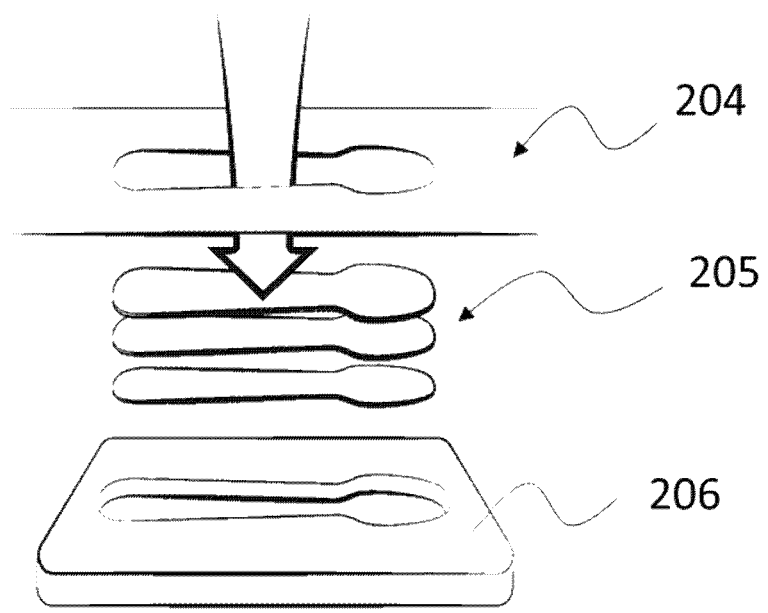

FIG. 2 schematically shows an embodiment, wherein a multi-layer of coated cellulose based sheet material is provided and from which two dimensional shapes corresponding to the final three dimensional product are cut out. These two dimensional cut out shapes are stacked in the bottom part of a forming mold of a form press.

Figure 3:
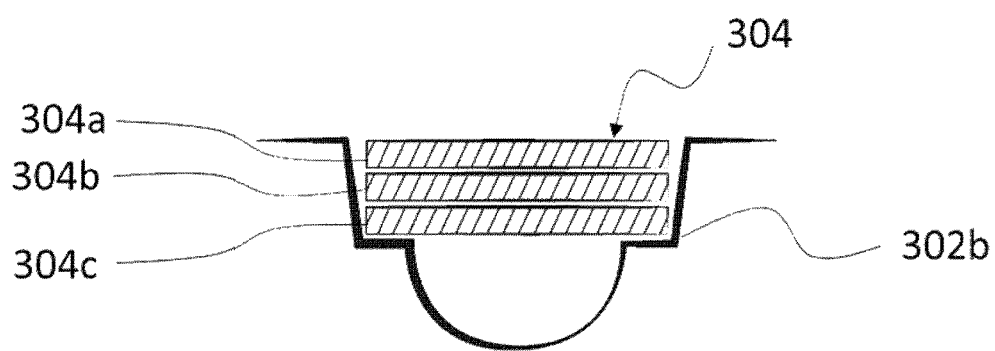

FIG. 3 schematically shows a cross sectional view of an embodiment, wherein in the bottom part of the forming mold three, two dimensional cut outs are arranged in a stack before form pressing the stack.

Figure 4:
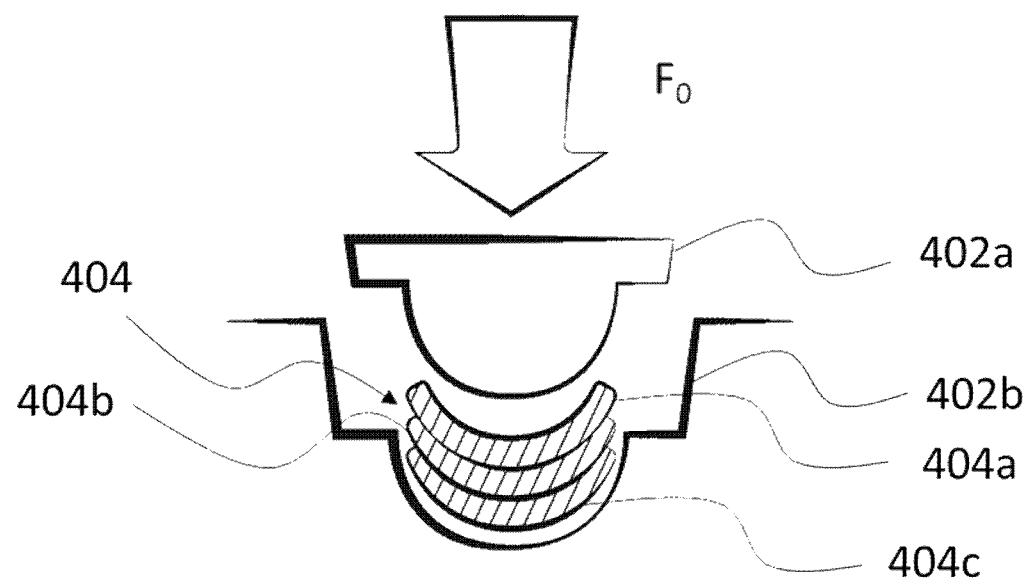

FIG. 4 schematically shows an embodiment where the stack of cellulose based cut outs is form pressed into a three dimensional product by pressing the stack of cut outs into the bottom part of the mold through the top mold part approaching it, whereby the mold is successively closed.

Figure 5:
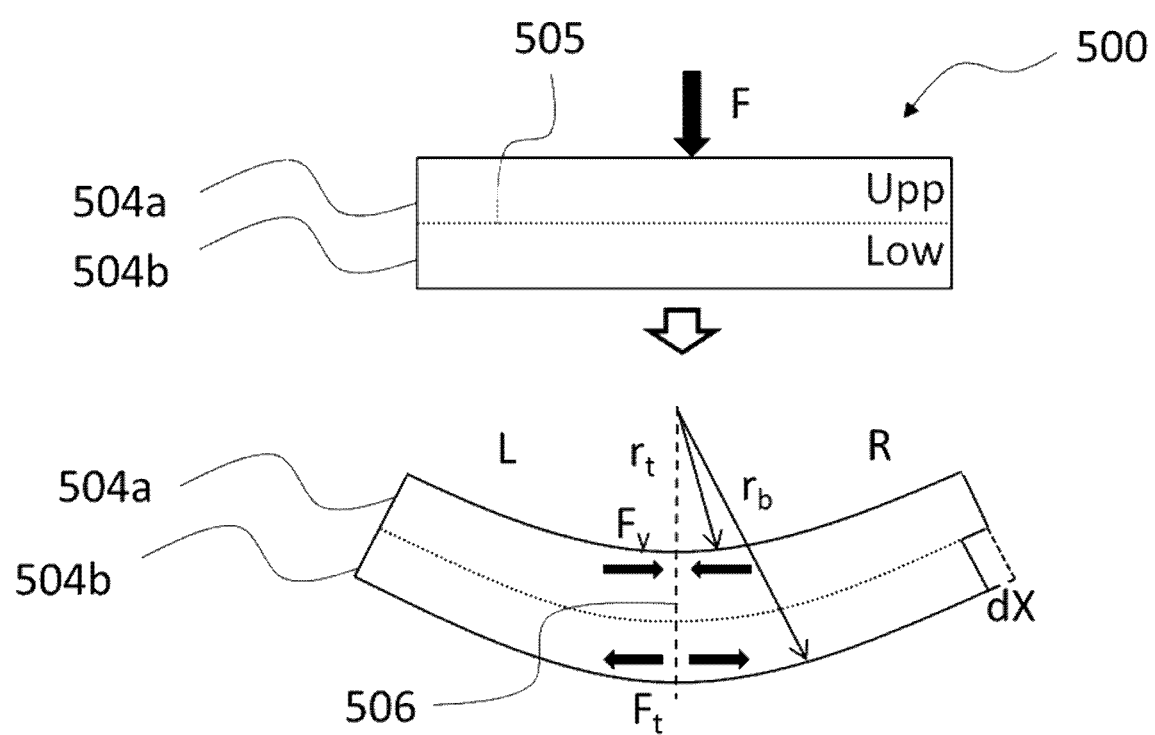

FIG. 5 schematically shows a single layered massive structure, which is subject to a bending force F, whereas the figure serves to illustrate the tensile and yield stresses.

Figure 6:
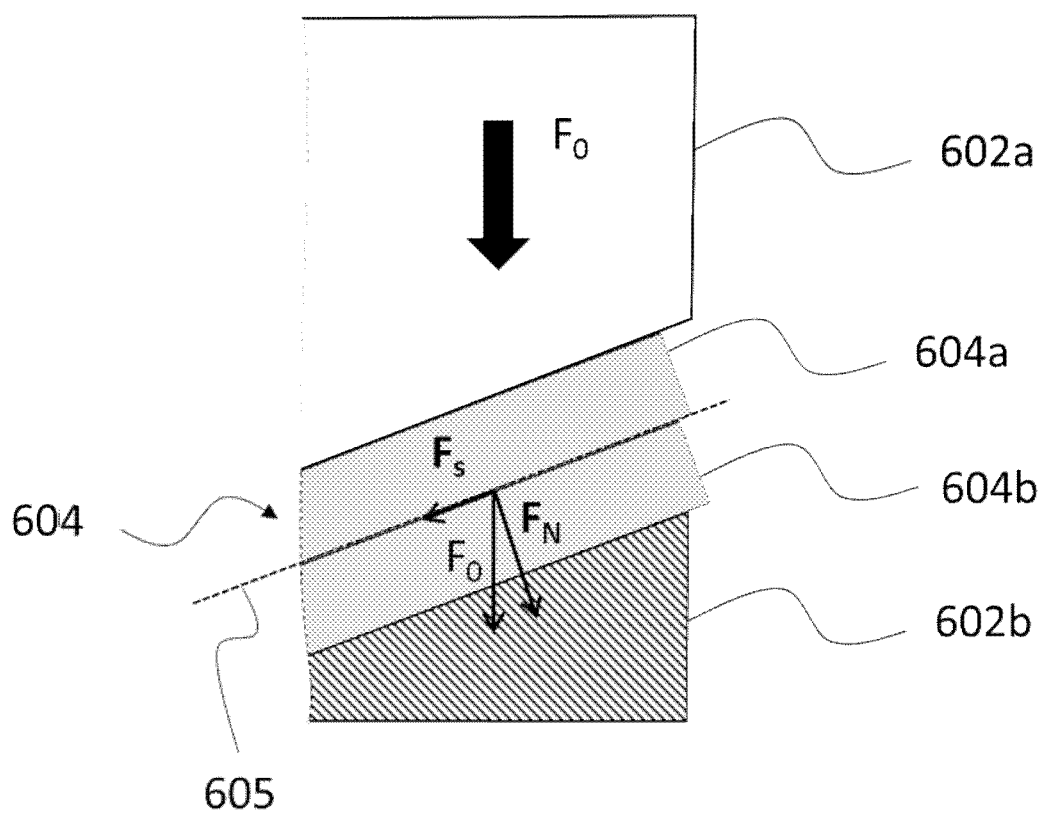

FIG. 6 schematically shows a detailed cross sectional view of an embodiment of the upper mold part and the lower mold part having a first and a second layer stacked between the two mold parts. Additionally, the corresponding forces acting upon these layers when being form pressed are indicated by arrows.

Figure 7:
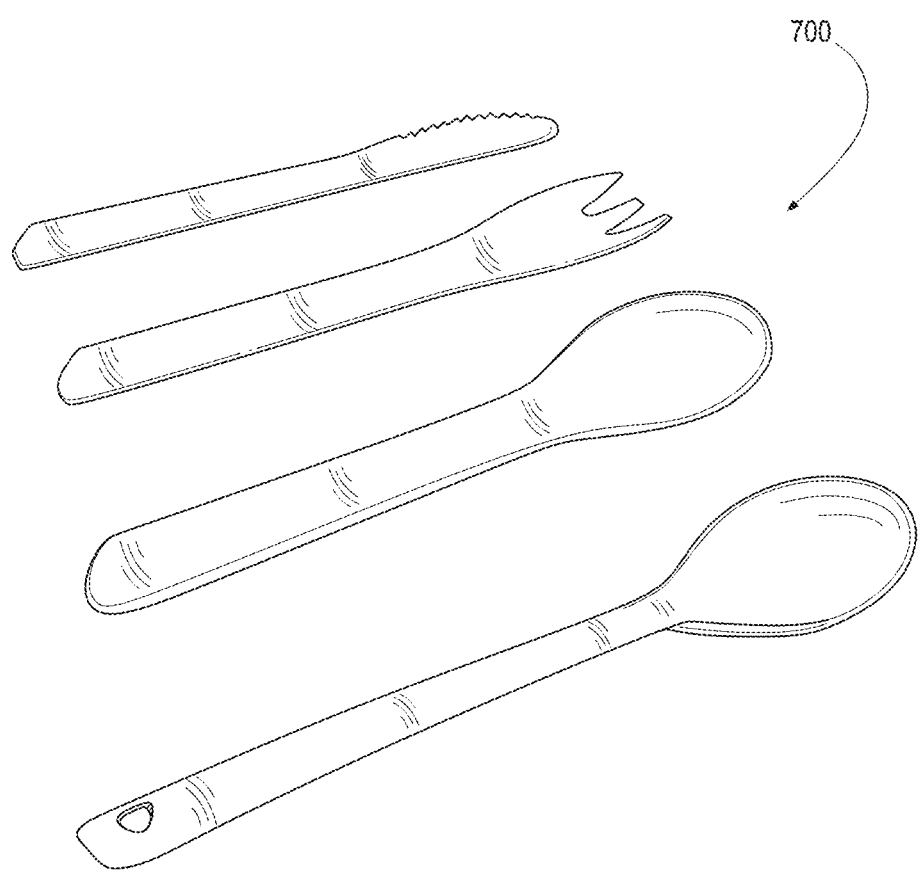

FIG. 7 shows respective embodiments of cellulose based products. Spoon and knife are made from layers of cupstock paper.

V. DETAILED DESCRIPTION OF THE INVENTION

The present application relates to a method of producing a cellulose-based product. The term "cellulose-based product" refers to a product that is mainly constituted of cellulose. Said product preferably has a three-dimensional shape. With respect to its shape, there exist in principle no limitations. The cellulose-based product as prepared by the method as claimed is particularly useful for packaging of any kind of objects or to be used, in particular in combination with food items. Products, for example are trays, plates, bowls, containers and cutlery. One particular aspect with regard to the cellulose-based products as prepared by the method as claimed is cutlery, in particular, cutlery for single use, which further particular is biodegradable, compostable and/or recyclable.

Within the first step of said process at least two layers including one first and one second layer are provided. The first and the second layer may be identical or different from each other. The term "identical or different" refers not only to differences in, e.g. grammature and/or coating of the layer's top or bottom side or to the cellulose fibers incorporated in said layers, but also with regard to the structure of said cellulose fibers.

The cellulose fibers incorporated within said first and/or second layer may be of any origin. The cellulose fibers are generated according to processes known in the art from any kind of wood, i.e. preferably soft wood or hard wood, or bamboo, bagasse, wheat straw, grass, cocoa-shell fibers, coconut-shell fibers, hemp fibers, etc.

The cellulose fibers are arranged to form cellulosed based sheets, or paper, or board, wherein an individual sheet corresponds to a layer, e.g. a first and/or a second layer. In a preferred embodiment the cellulose based fibers are arranged to form a sheet of cupstock paper. In other words, in a preferred embodiment cupstock paper is used for one first and at least one second layer.

The original layer material is further pretreated with an adhesive coating, which has e.g. hot glue properties, e.g. the viscosity of the coating is temperature dependent, such that at higher temperatures, e.g. temperatures above 50° C., the viscosity of the coating becomes more liquid like or softens, such that, for example wetting of surfaces of adjacent layers through the coating and within the stack is enhanced. Upon cooling down of the form pressed stack, e.g. below the forming temperature of e.g. 50° C. the adhesive coating solidifies and the layers are glued together. The stacked layers are then in a single layer configuration, i.e. the layers are two dimensionally interconnected with each other such that the layers are not separable from each other by hand, for example.

The coating provides heat-sealable properties during processing and water- and grease-resistant properties for the final product performance/usage by the customers.

The adhesive coating, or the adhesive film, may be any coating having adhesive properties known to the person skilled in the art. For example, the coating may comprise water-based dispersions or emulsions, such as the commercially available varnishes from the companies Stora Enso, Kotkamills, Solenis or the Flint Group. The most important feature of the adhesive coating is that it maintains a viscosity during step (iii) defined in the method of the invention allowing the layers to remain moveable with respect to each other and solidifies upon cooling and builds an adhesive layer.

In one embodiment the coating composition is a combination of a drying oil, a resin, and a thinner or solvent. Preferably, the solvent is water, or at least the content of water compared to organic solvents is very high, i.e. at least 4:1. There are many different types of drying oils, including linseed oil, tung oil, and walnut oil. These contain high levels of polyunsaturated fatty acids. Many different kinds of resins may be used within the coating composition to be used within the ambit of the method as claimed herein. Natural resins include amber, kauri gum, dammar, copal, rosin (pine resin), sandarac, balsam, elemi, mastic, and shellac. Synthetic resins such as acrylic, alkyd, or polyurethane may also be used.

In one embodiment, the adhesive coating composition is an emulsion on the basis of an alkyd resin. Alternatively, the coating composition may be one on the basis of a polyurethane or an epoxy resin.

In a particular embodiment the coating is biodegradable/compostable/recyclable, e.g. the coating is soy based, or linseed oil based.

Within the second step of said process the layers are arranged, e.g. positioned, in the cavity of the lower part of the forming mold of a form press, whereas the layers are stacked upon each other. The stacked layers are thereby in loose contact with their adjacent layers. Therefore the stacked layers are free to move, e.g. to shift against each other, in particular upon deformation due to external forces acting upon the stack.

In a preferred embodiment one side of each layer is coated with an adhesive coating and the layers are stacked, such that between adjacent layers an adhesive coating is located. In this preferred embodiment, e.g. the upper most layer, which forms the top surface of the stack, i.e. the product top surface side, is formed by the uncoated side of this layer.

Correspondingly, e.g. the lower most surface, which is formed by the bottom surface of the stack, is the coated side of the lower most layer. That is, because the particular layers are not flipped around before pressing. Alternatively, neither of the top surfaces, which form the customer sides of the final product, are layer coated surfaces. Or further alternatively, the top product surfaces are formed by coated sides of each respective upper, lower layer, e.g. the top layers have two side coatings.

Within the third step of said process the stacked layers are pressed by closing the form press, e.g. the upper and lower part of the form press mold are approaching each other. Closing of the form press will exert a forming pressure onto the stack upon which the stack is subject to deformations, which transform the stack into the three dimensional shape of the product. The upper and lower part of the form press may continuously approach each other during form pressing. A discontinuous movement can be thought of as well to, for example to build up a predetermined pressure profile. Depending on the elastic properties of the stacked layers, a material specific end-pressure is pre-determined and ultimately reached upon form pressing. When the forming end-pressure is reached the process of form pressing is finished, e.g. if an end-pressure of at most 1100 MPa is reached, the upper part of the press is automatically withdrawn and the pressed stack is released. Generally the end pressure is set to a value of 1 MPa to 1100 MPa, or to 5 MPa to 100 MPa, or 1 MPa to 50 MPa, or 1 MPa to 10 MPa, or 10 to 20 MPa.

The cellulose based product may be formed in the forming mold during a forming time period in the range of 0.001 to 20 seconds. Alternatively, the forming time period may be 0.01 to 15.0 seconds or 0.1 to 10.0 seconds. The time period is chosen so that the desired properties of the cellulose based products are achieved, e.g. the stiffness being at least 20%, e.g. about 30% higher than compared to form pressing a pre-laminated stack, while resulting in good adhesion between the layers, which in turn contributes significantly to the mechanical properties and useability of the cellulose product. For example, when attempting to tear individual layers of the final product apart, no separation between the actual coated and cured contact surfaces of the layers is observed. Rather, the cellulose based material of the layers itself begins to separate from each other.

During form pressing of the stack, the forming mold, e.g. the upper or the lower or both parts of the forming cavity of the forming mold are heated to a forming temperature in the range of 30° C. to 300° C., preferably 50° C. to 300° C., further preferred 50° C. to 200° C., still further preferably 50° C. to 100° C. e.g. 60° C. to 80° C. That is, the temperature of the forming cavity is kept constant during form pressing at the forming temperature of, e.g. 70° C. Heating of the forming mold may take place before arranging the stack in the forming mold or at least partly before form pressing in the forming mold. This may for example be accomplished through arranging a suitable heating unit in the manufacturing process.

The forming mold cavity, e.g. the upper and/or the lower part of the forming mold of the form press can be constructed to allow for isostatic pressing of the stack, i.e. the molding pressure applied is evenly distributed in all directions around the stack of layers. Therefore, the upper and/or lower part of the forming mold comprises flexible, e.g. liquid like mold parts.

Within the third step of said process the stacked layers are pressed into a single layer configuration. The individual layers can be visible by eye to a customer. The layers are two dimensionally interconnected with each other that is the layers, e.g. the cured interconnected coated sides of the layers, are not separable from each other by hand, for example. The layers are thereby rather separated by tearing the actual cellulose based layer material apart.

The press formed layers thus form a composite material in the sense that the material is made from two or more constituent materials, e.g. the coating and the cellulose based layers, with significantly different physical or chemical properties that when combined, a material is produced with characteristics different from the individual components, e.g. the increased stiffness. The individual components remain separate and distinct to some extend taking under consideration that the coating will under the influence of heat for example embed at least partially into the cellulose based layers, for example due to its softening properties under the influence of heat, thereby further reinforcing the finished press formed structure. The final composite product thus differentiates from solid products and mixtures, wherein in the case of mixtures the initial spatial distribution of the compounds is lost by mixing and the final product has its own distribution of constituent materials.

According to other aspects of the invention, the first layer and/or the second layer comprise one or more additives that are altering the properties, e.g. the mechanical, hydrophobic, and/or oleophobic properties of the cellulose-based product. Each of the first layer and/or the second layer can have a material composition of 50 to 90% dry wt cellulose fibres and 10 to 30% dry wt of the one or more additives. The examples of additives of the first layer and/or the second layer are starch compounds, rosin compounds, butanetetracarboxylic acid, gelatin compounds, alkyl ketene dimer (AKD), Alkenyl Succinic Anhydride (ASA), wax compounds, silicon compounds, calcium compounds, and/or fluorocarbons. By using additives in the first layer and/or the second layer, the properties of the cellulose-based product can be efficiently steered and controlled. The additives can alter the properties, e.g. the mechanical, hydrophobic, and/or oleophobic properties so that the cellulose-based product can be used for different purposes. For example, it can be possible to create a scratch free surface by the use of a starch compound or a calcium compound, such as calcium carbonate, as an additive.

Other additives, that may be suitable for products coming into contact with food, used in the different layers are for example; carbonate salts; polysaccharides; minerals, such as silica; paraffins, such as microcrystalline waxes, low-molecular polyolefins and polyterpenes; polyvinyl alcohol; silicone oils resins or elastomers; chromium chloride complexes; aluminium, calcium, sodium, potassium, and ammonium salts; casein; mannogalactanes; sodium salt of carboxymethyl cellulose; methyl cellulose; hydroxyethyl cellulose; alginates; xanthane; copolymer structures; basic potassium zirconium carbonate; imidazolium compounds; phosphoric acid ester of ethoxylated perfluoropolyetherdiol; modified polyethylene terephthalates, perfluoropolyetherdicarbonic acid; polyhexafluoropropylene oxide.

According to other embodiments of the invention, the one or more additives of the first layer and/or the second layer are added to the respective layer prior to or after said step (i) of the process.

In a further embodiment of the present invention, the method of producing a cellulose-based product defined by said steps (i) to (iii) of said process can be carried out in a batch-wise or continuous manner, preferably a continuous manner. In this embodiment the at least one first and at least one second layer(s) may be provided in the form of a continuous layer, e.g. similar to a conveyor belt, from which two dimensional cut outs corresponding to the three dimensional final product shape are continuously made. These cut outs are eventually automatically fed into the cavity of the, e.g. lower forming mold and thereby automatically arranged in a superimposed relationship as it is described in step (ii) of the method to generate the stack of first and second layers. In particular, said continuous process is particularly efficient for manufacturing the cellulose-based product.

In a certain embodiment, at least one of the layers of the multilayer cellulose-based product is a pre-printed or a colored layer. For example, the layers which are exposed to the customers for handling the final product are colored or label imprinted. For example, preprinting or coloring is used for branding and/or content descriptions, eliminating the need for additional labels, or to obtain an attractive appearance of the cellulose-based product. The layer or layers may be colored through any suitable conventional coloring method, and graphical figures or patterns may be printed on the layer or layers so that the cellulose-based product will have an aesthetically appealing design.

As part of method step (iii) the stack of first and second layer may be form pressed together with a barrier layer, said barrier layer has been provided in said mold and—as a result of the form pressing step—is ultimately adhered to the cellulose-based product. The barrier layer can for example be made of a suitable polymer film, such as a thermoplastic film, or similar structure that is acting as a barrier for liquids and/or gases.

The invention will be described in greater detail in the following, with reference to the attached drawings according to FIGS. 1 to 7.

In the embodiments of FIGS. 1 to 7 during arrangement of the first 104*a* and the second 104*b* layer in a superimposed manner in the lower forming mold 102*b* the layers 104*a*, 104*b* have an essentially flat shape. However, other initially non-flat layers can alternatively be arranged in the lower 102*b* or likewise upper part 102*a* of the forming mold 102. The multi-layer stack 104 positioned in the forming mold 102 of the form press 101 presents a shape similar to the shape of the final product 103, 700 desired.

A flat shape may refer to a generally two-dimensional shape, such as for example the shape of a sheet material initially provided, and essentially non-flat shapes may refer to any suitable three-dimensional shape. The cellulose based product 103, 700 may have complex shapes with different thicknesses, or portions having holes or openings. For instance, the cellulose based product 103, 700 can comprise creases, shaped text, hinges, threads, handles or surface patterns.

FIG. 1 schematically shows an embodiment of a method of producing a cellulose based product 103 from two cellulose based layers 104*a*, 104*b*. Most preferably the layers 104*a*, 104*b* are essentially made of cupstock paper and the two layers 104*a*, 104*b* are arranged in a superimposed relationship to each other in the bottom part 102*b* of a forming mold 102 of a form press 101, thereby generating a stack 104 of layers 104*a*, 104*b*. After positioning of these layers 104*a*, 104*b* in the bottom of the forming mold 102*b*, the upper part 102*a* of the forming mold 102 approaches the stacked layers 104 from top, whereas a forming pressure builds up, which acts onto the stack 104 and thus onto the individual layers 104*a*, 104*b*. At some point in time after initializing the pressing motion the end-pressure is reached, which is a predetermined pressure of e.g. 1100 MPa, whereas upon reaching the end-pressure the upper part 102*a* of the form press 101 preferably automatically withdraws from the bottom part 102*b* of the forming mold 102. Upon withdrawal of the forming parts 102 the pressed three dimensional predetermined product shape is at least partially exposed to temperatures below the forming temperature and the compact single layer configuration is cured due to the hot glue characteristics of the coating. Generally the end pressure is set to a value of 1 MPa to 1100 M Pa, or to 5 M Pa to 100 M Pa, or 1 M Pa to 50 M Pa, or 1 M Pa to 10 M Pa, or 10 to 20 MPa.

As schematically shown in FIG. 2, the initially provided cellulose based layers 204 are prior to positioning pre-shaped by cutting a two dimensional shape 205, which corresponds to the final three dimensional product shape, out of the initially provided sheet like layers 204, e.g. the shape of a spoon. That is, these cutouts 205 are arranged in the lower part 102b of the forming mold 102. Thereby the initially provided cellulose based layers 204 are cut individually or, in order to increase efficiency, the layers are cut in a single process step. That is, cutting of the layers can be done by punching, for example an initially provided sheet material from top to down. In a preferred embodiment, the downwards movement also pushes the cutout 205 into a cavity 206, which eventually will be the lower part 102b of the press forming cavity of the mold 102.

FIG. 3 schematically shows arranging the cellulose based layers 304a, 304b, 304c in the lower part 302b of the press forming cavity of the forming mold 302. In this superimposed relationship the at least first, second and third second layer 304a, 304b, 304c are arranged in loose contact with each other, which is indicated in FIG. 3 by drawing the stacked layers 304 slightly separated from each other. In the superimposed relationship of the stack 304, the layers 304a, 304b, 304c are arranged on top of each other so that the layers 304a, 304b, 304c are in contact but are still able to move against each other, i.e. the layers 304a, 304b, 304c are able to shift along each other's adjacent surfaces, when a force, e.g. the press forming force is acting upon the layers 304a, 304b, 304c or upon an individual layer 304a. The layers are arranged as discrete pieces. The order of the different layers 304a, 304b, 304c in the stack may be altered depending on the desired properties of the resulting cellulose based product 103, 700. In the embodiment of FIG. 3 the first layer 304a is positioned on top of the second layer 304b and so on or in opposite order. The layers 304a, 304b, 304c are arranged in the lower mold part 302b manually or automatically, e.g. layer by layer by hand, or the first, the second, the third layer 304a, 304b, 304c, etc. are supplied by a conveyor belt or in a robotics-assisted manner known to those skilled in the art. In one embodiment said layer(s) 304a, 304b, 304c is/are supplied continuously, e.g. by a conveyor belt and the cutout geometries 205 of the final product 103, 700 are essentially automatically punched out and arranged in the lower part of the forming mold 302b such that the production process is a continuous one step process. The forming mold may 302 be arranged in a suitable forming mold unit comprising high pressure tools and other necessary pressing equipment.

FIG. 4 schematically shows an embodiment where a stack 404 consisting of a first, second and third cellulose based coated layer 404a, 404b, 404c is pressed into the lower part of the forming mold cavity 402b by a pressing motion of the upper mold part 402a. Upon this pressing motion, the stack 404 begins to deform from its initial two dimensional cut out shape 205 into the desired three dimensional product shape. Due to the curvature of the final product shape the initial pressing force $F_O$ is to some extend translated into shear forces $F_S$ acting upon each layer 404a, 404b, 404c. The shear forces $F_S$ can vary over the thickness of the stack 404 depending on the degree of deformation. For example, depending on the product shape or product design, the radius of curvature of a spoon on its top surface, e.g. the upper most layer 404a of the stack 404, distinguishes more or less from the radius of curvature of its bottom surface, the bottom layer 404c of the stack 404.

This context is further illustrated in detail in FIG. 5. FIG. 5 shows an initially straight massive structure 500, e.g. a cross section of a part of a spoon, upon which an external bending force F is acting and which then bends the structure. A dotted middle line 505 is shown, which separates the structure into an upper part "Upp" and into a lower part "Low". Further, a dashed symmetry line 506 separates the bended structure into a left "L" and right section "R". Two radii of curvature $r_t$ and $r_b$ are measured from the symmetry line 506, whereas $r_t$ refers to the top of the structure and $r_b$, refers to the bottom of the structure 500. Because the radii of curvature distinguish from each other through bending, "Upp" is subject to yield stress, which is indicated by $F_y$, whereas "Low" is subject to tensile stress indicated by $F_t$. The two counteracting forces $F_y$ and $F_t$ cancel each other out only at the intersecting point between the symmetry line 506 and the middle line 505. The counteracting forces thus destabilize the internal of the bended structure 500. Therefore, in order to reduce the degree of destabilization by these internal forces, the structure is split apart into individual layers 504a, 504b, e.g. separating the massive structure 500 between "Upp" and "Low". Upon deformation caused by the external bending force F, the lower part "Low" and the upper part "Upp" would then shift against each other, as it is for simplicity reason only indicated on the one side "R" of FIG. 5 by an amount characterized as dX, thereby releasing some of the tension caused by bending the two layers 504a, 504b.

In the following the forces acting between the individual layers 504a, 504b are further considered. That is the external bending force is not perpendicular pressing onto a layer, but mimics the three dimensional shape of the final product 103, 700. Thus, the bending forces are split into smaller forces acting in different directions upon the layers 504a, 504b.

FIG. 6 schematically shows a detailed view of the upper mold part 602a and the lower mold part 602b with a first 604a and a second 604b layer stacked in between the two mold parts 602, wherein the corresponding forces are indicated by arrows. The forces appear when form pressing the stacked layers 604. In detail, when the upper part 602a of the form press 101 approaches the top layer 604a of the stack 604, i.e. the layer 604a, which faces towards the upper part 602a of the mold 602, compression of the stacked layers 604 commences. This pressing force $F_O$ thus initially acts upon the top layer 604a of the stack 604, whereas the first layer 604a transmits the pressing force $F_O$ towards the further underlying layers 604b, i.e. the second layer 604b. The force $F_O$ is shown split apart in FIG. 4 into a normal force $F_N$ and a shear force $F_S$. The normal force $F_N$ points normally onto the lower part 602b of the form press mold 602. The shear force points along a shear line 605 as shown indicated with dotted points in FIG. 6 and which is located between the two layers 604, 604b. The shear force direction thus corresponds to the curvature of the upper 602a, lower 602b form part respectively. Expressed in more general terms, the direction of the shear force vector essentially points along the curvature of the upper 602a/lower 602b part of the form press mold 602. Because the stacked layers 604 are moveable with respect to each other, the shear forces are only absorbed due to mechanical friction between the layers 604a, 604b. The strength of the friction scaled with the forming pressure and thus friction between the layers 604a, 604b increases during form pressing. Consequently, friction between the layers 604a, 604b is initially low, and thus, the emerging shear forces only couple to some extend into the individual layers 604a, 604b, which allows the layers 604a, 604b to shift or move or migrate against each other. Hence, stress which occurs during formation is reduced and not fully incorporated into the final cellulose based product 103, 700, leaving the final product 103, 700 with higher mechanical stiffness. Because respective layers 604a, 604b are arranged to have at least one coated side of a layer 604a, 604b located between each other, friction between the individual layers 604a, 604b also depends on the properties of the coating.

FIG. 7 shows respective embodiments of cellulose based products 700. Spoon and knife are made from layers of cupstock paper.

VI. LIST OF REFERENCES

101 Form press;
102 Forming mold;
102a-602a Upper part of the forming mold;
102b-602b Lower part of the forming mold;
103, 700 Cellulose based product;
104-604 Stack;
104a-604a First layer;
104b-604b Second layer;
105 Forming cavity;
204 Initial cellulose based layer;
205 Cutout;
206 Cavity;
304c-404c Third layer;
500 Structure;
505 Middle line;
506 Symmetry line;
605 Shear line.

The invention claimed is:

1. A method of producing a cellulose-based product (103,700), wherein the method comprises the steps of:
   (i) providing at least two layers including one first (104a) and one second (104b) layer, and wherein said first (104a) and second layer (104b) each comprise cellulose fibers, and wherein at least one side of said first (104a) and/or said second (104b) layer is pre-treated with an adhesive coating,
   (ii) arranging said at least two layers including the one first (104a) and the one second (104b) layers in a superimposed relationship to each other in a forming mold (102) of a form press (101), thereby generating a stack (104) of said at least two layers including the one first (104a) and the one second (104b) layers, wherein said first (104a) and second (104b) layers are oriented within the stack (104) such that said at least one pre-treated side of said respective first (104a) and/or second (104b) layer is facing towards the superimposed layer, and
   (iii) form pressing said stack (104) of at least two layers including the one first (104a) and the one second (104b) layers in a forming mold (102) at a forming temperature of at least 50° C. up to a forming end-pressure of at most 1100 MPa, into a cellulose-based product (103, 700) of a predetermined shape and a single layer configuration,
   characterized in that
   in said step (iii) said layers including said one first (104a) and said one second (104b) layers are moveable with respect to each other until said forming end-pressure is reached, wherein movement of said layers results in an edge of the cellulose-based product having a stairstep profile; and wherein the individual layers of the cellulose-based product are visible in said edge by eye to a customer.

2. The method of claim 1, wherein the adhesive coating is a water-based dispersion.

3. The method of claim 1, wherein the adhesive coating is selected from the group consisting of soy based adhesives and linseed oil based adhesives.

4. The method of claim 1, wherein the area weight of said coating ranges from 0.5 to 50 gsm of the first (104a) and/or (104b) second layer.

5. The method of claim 1, wherein said first (104a) and/or second (104b) layer comprise one or more additives that are altering the mechanical, hydrophobic, oleophobic, haptic, or aesthetic properties of the cellulose-based product, and wherein said first and/or second layer are constituted by 50 to 90% dry wt cellulose fibers and 10 to 50% dry wt of said one or more additives.

6. The method of claim 5, wherein said one or more additives are selected from the group consisting of starch compounds, rosin compounds, polycarboxylic acids, gelatin compounds, alkyl ketene dimer (AKD), alkenyl succinic anhydride (ASA), wax compounds, silicon compounds, calcium compounds and fluorocarbons.

7. The method of claim 5, wherein said one or more additives are added to said first (104a) and/or second (104b) layer prior to step (i).

8. The method of claim 1, wherein the forming mold (102) is heated to a forming temperature of from 50° C. to 200° C.

9. The method of claim 1, wherein the coating is applied with the same or a varying thickness to at least one side of each of the layers (104a, 104b).

10. The method of claim 1, wherein each of said first (104a) and second (104b) layers has an area weight ranging from 50 to 2000 gsm.

11. The method of claim 1, wherein said stack (104) comprises or consists of 2 to 10 first (104a) and second (104b) layers.

12. The method of claim 1, wherein the total weight of the at least two layers including the one first (104a) and the one second (104b) layers is in the range of 650 to 2200 gsm.

13. The method of claim 1, wherein a surface of said cellulose-based product (103, 700) is dip coated or sprayed or curtain poured or brushed with a finish.

14. The method of claim 1, wherein said stack (104) comprises one or more additional layers (304c, 404c), which comprise 2 to 5% dry wt of thermoplastic reinforcing fibers having a melting temperature below the forming temperature.

15. A cellulose-based cutlery and/or cellulose-based tableware manufactured according to the method of claim 1, wherein the individual layers of the cellulose-based cutlery and/or cellulose-based tableware are visible by eye to a customer in an edge of the cellulose-based cutlery and/or cellulose-based tableware having a stairstep profile.

16. The method of claim 2, wherein the adhesive coating is biodegradable and/or recyclable.

* * * * *